(12) United States Patent
Massari et al.

(10) Patent No.: US 7,872,074 B2
(45) Date of Patent: *Jan. 18, 2011

(54) IMPACT RESISTANT POLYOLEFIN COMPOSITIONS

(75) Inventors: Paola Massari, Ferrara (IT); Jean News, Newark, DE (US); Marco Ciarafoni, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 316 days.

This patent is subject to a terminal disclaimer.

(21) Appl. No.: 12/085,078

(22) PCT Filed: Nov. 14, 2006

(86) PCT No.: PCT/EP2006/068423

§ 371 (c)(1),
(2), (4) Date: May 15, 2008

(87) PCT Pub. No.: WO2007/060114

PCT Pub. Date: May 31, 2007

(65) Prior Publication Data

US 2009/0283935 A1    Nov. 19, 2009

Related U.S. Application Data

(60) Provisional application No. 60/739,235, filed on Nov. 23, 2005.

(30) Foreign Application Priority Data

Nov. 22, 2005   (EP) .................................. 05111084

(51) Int. Cl.
C08L 23/00    (2006.01)
C08L 23/04    (2006.01)
C08L 23/10    (2006.01)

(52) U.S. Cl. ...................... 525/191; 525/240

(58) Field of Classification Search ............... 525/191, 525/240
See application file for complete search history.

(56) References Cited

U.S. PATENT DOCUMENTS

| | | | |
|---|---|---|---|
| 4,399,054 A | 8/1983 | Ferraris et al. | |
| 4,469,648 A | 9/1984 | Ferraris et al. | |
| 4,521,566 A | 6/1985 | Galli et al. | |
| 4,971,937 A | 11/1990 | Albizzati et al. | |
| 5,221,651 A | 6/1993 | Sacchetti et al. | |
| 5,539,067 A | 7/1996 | Parodi et al. | |
| 5,618,771 A | 4/1997 | Parodi et al. | |
| 5,698,642 A | 12/1997 | Govoni et al. | |
| 5,753,769 A | 5/1998 | Ueda et al. | |
| 5,969,049 A | 10/1999 | Ueda et al. | |
| 6,127,304 A | 10/2000 | Sacchetti et al. | |
| 6,194,342 B1 | 2/2001 | Parodi et al. | |
| 6,323,152 B1 | 11/2001 | Sacchetti et al. | |
| 6,407,028 B1 | 6/2002 | Sacchetti et al. | |
| 6,413,477 B1 | 7/2002 | Govoni et al. | |
| 6,437,061 B1 | 8/2002 | Sacchetti et al. | |
| 6,515,085 B1 | 2/2003 | Parodi et al. | |
| 6,686,307 B2 | 2/2004 | Sacchetti et al. | |
| 6,689,845 B1 | 2/2004 | Govoni et al. | |
| 6,777,508 B1 | 8/2004 | Parodi et al. | |
| 6,818,187 B2 | 11/2004 | Govoni et al. | |
| 6,818,583 B1 | 11/2004 | Morini et al. | |
| 6,825,309 B2 | 11/2004 | Morini et al. | |
| 7,022,640 B2 | 4/2006 | Morini et al. | |
| 7,049,377 B1 | 5/2006 | Morini et al. | |
| 7,169,871 B2 | 1/2007 | Morini et al. | |
| 7,288,598 B2 | 10/2007 | Pelliconi et al. | |
| 7,649,052 B2 * | 1/2010 | Massari et al. ............... | 525/240 |
| 2005/0032633 A1 | 2/2005 | Morini et al. | |
| 2006/0047071 A1 | 3/2006 | Pelliconi et al. | |
| 2007/0078224 A1 | 4/2007 | Dominic et al. | |
| 2007/0203298 A1 | 8/2007 | Massari et al. | |

FOREIGN PATENT DOCUMENTS

| | | |
|---|---|---|
| EP | 45977 | 2/1982 |
| EP | 77532 | 4/1983 |
| EP | 361494 | 4/1990 |
| EP | 395083 | 10/1990 |
| EP | 704463 | 4/1996 |
| EP | 728769 | 8/1996 |
| EP | 782587 | 7/1997 |
| EP | 1272533 | 1/2003 |
| JP | 58162621 | 9/1983 |

(Continued)

OTHER PUBLICATIONS

Y. Inoue et al., "Studies of the stereospecific polymerization mechanism of polypropylene by a modified Ziegler-Natta catalyst based on 125 MHz $^{13}$C n.m.r. spectra," *Polymer*, vol. 25, p. 1640-1644 (1984).

(Continued)

*Primary Examiner*—Nathan M Nutter
(74) *Attorney, Agent, or Firm*—William R. Reid

(57) ABSTRACT

The present invention provides polyolefin composition comprising a 50-80 wt % of propylene homopolymer or copolymer and a first and a second ethylene/alpha-olefin copolymer, said composition having good stress whitening resistance and gloss, in combination with a good balance of mechanical properties.

9 Claims, No Drawings

FOREIGN PATENT DOCUMENTS

| | | |
|---|---|---|
| WO | 98/44009 | 10/1998 |
| WO | 00/02929 | 1/2000 |
| WO | 00/63261 | 10/2000 |
| WO | 03/051984 | 6/2003 |
| WO | 03/076511 | 9/2003 |
| WO | 2005/044911 | 5/2005 |
| WO | 2005113672 | 12/2005 |

OTHER PUBLICATIONS

R. Chûjô et al., "Two-site model analysis of $^{13}$C n.m.r. of polypropylene polymerized by Ziegler-Natta catalyst with external alkoxysilane donors," *Polymer*, vol. 35(2), p. 339-342 (1994).

* cited by examiner

IMPACT RESISTANT POLYOLEFIN COMPOSITIONS

This application is the U.S. national phase of International Application Number PCT/EP2006/068423, filed Nov. 14, 2006, claiming priority to European Patent Application 05111084.9 filed Nov. 22, 2005, and the benefit under 35 U.S.C. 119(e) of U.S. Provisional Application No. 60/739,235, filed Nov. 23, 2005; the disclosures of International Application Number PCT/EP2006/068423, European Patent Application 05111084.9 and U.S. Provisional Application No. 60/739,235, each as filed, are incorporated herein by reference.

The present invention relates to polyolefin compositions having good stress whitening resistance and gloss, in combination with a good balance of mechanical properties, to the process for the preparation of said polyolefin compositions and to their use.

It is known in the art that propylene homopolymers are endowed with good stiffness but they have poor impact resistance and elongation values. The improvement in the impact resistance properties, particularly at low temperatures, brought about by the addition of a rubbery component is normally associated with the impairing of the stiffness of the propylene homopolymers.

Several attempts have been made to provide propylene polymer compositions having a good balance of stiffness and impact properties. For example, the Japanese Patent Laid-Open Patent application No. 162621/1983 describes an olefin block copolymer made of 20-70 pbw of a highly crystalline propylene polymer, 5 to 30 pbw of a propylene-ethylene random copolymer containing from 8 to less than 30 wt % of ethylene and 10 to 75 pbw of a propylene-ethylene random copolymer having an ethylene content of 30 to 85 pbw. The copolymer composition possesses good impact resistance at low temperatures and very high flexibility.

The addition of a rubbery phase to propylene homopolymers normally also adversely affects the optical properties of the homopolymer, resulting in propylene polymer compositions having low gloss. Generally, also the resistance to the stress whitening of said propylene polymer composition is unsatisfactory for the market needs.

Therefore, there is still the need for polyolefin compositions that maintain high stiffness and good impact resistance both at ambient and at low temperatures and that do not show the drawbacks of the polyolefin compositions already known in the art.

Thus, the present invention provides polyolefin composition comprising (percentages based on the sum of component (A) to (C):

(A) from 50 to 80 wt %, preferably from 55 to 70 wt %, more preferably from 60 to 70 wt %, of a propylene polymer having a polydispersity index (P.I.) value ranging from 4.5 to 10 and a content of isotactic pentads, measured by $^{13}$C-NMR on the fraction insoluble in xylene at 25° C., higher than 97.5 mol %, said polymer being selected among propylene homopolymers and copolymers of propylene with at least one linear or branched alpha-olefin having from 2 to 8 carbon atoms other than propylene, said copolymer containing at least 95 wt % (based on the copolymer) of units derived from propylene;

(B) from 5 to 20 wt %, preferably from 10 to 20 wt %, of a first copolymer of ethylene with at least one linear or branched alpha-olefin having 3 to 8 carbon atoms, said first ethylene copolymer containing from 25 to less than 40 wt % (with respect to the component (B)), preferably from 25 to 38 wt %, of units derived from ethylene and having solubility in xylene at 25° C. ranging from more than 85 to 95 wt %; and (C) from 10 to 40 wt %, preferably from 15 to 35 wt %, of a second copolymer of ethylene with at least one linear or branched alpha-olefin having 3 to 8 carbon atoms, said second copolymer containing from 50 up to 75 wt % (with respect to the component (C)), preferably from 55 to 70 wt %, of units derived from ethylene, having solubility in xylene at 25° C. ranging from 50 to 85 wt % and an intrinsic viscosity of the fraction soluble in xylene lower than 1.8 dl/g.

Preferably, the polyolefin composition of the invention comprises a total amount of copolymer (B) plus copolymer (C) ranging from 30 to 45 wt %, more preferably from 30 to 40 wt %, with respect to the total composition (sum of (A)+(B)+(C)).

Preferably, the polyolefin composition of the present invention are further characterized by at least one of the properties of the following set:

total ethylene content of less than 23 wt %; and/or the intrinsic viscosity of the total xylene soluble fraction lower than 2.3 dl/g, more preferably ranging from 1.6 to less than 2.3 dl/g; and/or Melt Flow Rate (MFR) value of from 2 to 30 g/10 min.

Preferably, the alpha-olefins are selected among ethylene, 1-butene, 1-pentene, 4-methyl-1-pentene, 1-hexene and 1-octene. More preferably, the propylene copolymer (A) is a propylene/ethylene copolymer and copolymers (B) and (C) are ethylene/propylene copolymers. The copolymers (B) and (C) can optionally contain recurring units deriving from a diene, conjugated or not, such as butadiene, 1,4-hexadiene, 1,5-hexadiene and ethylidene-norbornene-1. The diene, when present, is typically in an amount of ranging from 0.5 to 10 wt % with respect to the weight of the copolymer.

The Polydispersity Index of the propylene polymer (A) preferably ranges from 5 to 8. Typically, the molecular weight distribution of component (A), expressed by the ratio of the weight average molecular weight to the number average molecular weight (Mw/Mn), measured by GPC, is equal to or higher than 9, in particular it ranges from 9.5 to 20.

Typically, the value of the ratio of "z-average" molecular weight to number average molecular weight (Mz/Mn) of component (A), measured by GPC, is at least 4.5, preferably at least 5, more preferably it ranges from 5 to 10. The propylene polymer (A) preferably has an MFR value ranging from 10 to 200 g/10 min, more preferably from 50 to 120 g/10 min. The xylene-soluble fraction of propylene polymer (A) is normally lower than 5 wt %, preferably lower than 3 wt %.

In the polyolefin composition of the invention the intrinsic viscosity of the xylene-soluble fraction (XSIV) of component (C) is lower than the XSIV of the component (B). Preferably, the XSIV of component (B) ranges from 2.5 to 4.5 dl/g.

Typically, the polyolefin compositions of the present invention are endowed with at least one of the following properties:

Flexural Modulus of at least 600 MPa, preferably from 600 up to 1400 MPa, more preferably from 700 to 1300 MPa; and/or Izod impact resistance at 23° C. higher than 11 kJ/m$^2$, preferably ranging from 11 to 60 kJ/m$^2$, more preferably from 25 to 50 kJ/m$^2$; and/or Izod impact resistance at −20° C. higher than 5 kJ/m$^2$; and/or Elongation at break of at least 100%, preferably ranging from 150 to 900%, more preferably from 400 to 800%.

A further object of the present invention is a process for the preparation of the polyolefin compositions of the invention. The polyolefin compositions of the present invention can be prepared by polymerization process comprising at least three polymerization stages, with each subsequent polymerization stage being conducted in the presence of the polymeric material formed in the immediately preceding polymerization reaction, wherein the component (A) is normally prepared in at least one first polymerization stage and the copolymers (B) and (C) are normally prepared in at least two polymerization stages.

Preferably, each polymerization stage is carried out in presence of a highly stereospecific heterogeneous Ziegler-Natta catalyst. The Ziegler-Natta catalysts suitable for producing the polyolefin compositions of the invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound. Suitable catalysts systems are described in the European patents EP45977, EP361494, EP728769, EP 1272533 and in the international patent application WO00/63261.

According to a preferred embodiment, the solid catalyst component comprises Mg, Ti, halogen and an electron donor selected from succinates of formula (I):

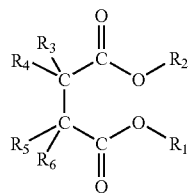

(I)

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred group of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Another preferred group of compounds within those of formula (I) is that in which at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Furthermore, also the compounds in which at least two radicals different from hydrogen are linked to different carbon atoms, that is $R_3$ and $R_5$ or $R_4$ and $R_6$ are particularly preferred.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The internal donor can be added during the treatment with $TiCl_4$ and the treatment with the electron donor compound can be repeated one or more times. Generally, the succinate of formula (I) is used in molar ratio with respect to the $MgCl_2$ of from 0.01 to 1 preferably from 0.05 to 0.5. The preparation of catalyst components in spherical form is described for example in European patent application EP-A-395083 and in the International patent application WO98/44009. The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10,000 Å generally ranges from 0.3 to 1.5 $cm^3/g$, preferably from 0.45 to 1 $cm^3/g$.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

External electron-donor compounds can be of the same type or they can be different from the succinates of formula (I). Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1,trifluoropropyl-metil-dimethoxysilane. The external electron donor compound is used in such an amount to give a molar ratio between the organo-aluminum compound and said electron donor compound of from 0.1 to 500, more preferably from 1 to 300 and in particular from 3 to 100.

The catalysts may be pre-contacted with small quantities of olefin (pre-polymerisation), maintaining the catalyst in suspension in a hydrocarbon solvent, and polymerising at temperatures from 25° to 60° C., thus producing a quantity of polymer from 0.5 to 3 times the weight of the catalyst. The operation can also take place in liquid monomer, producing, in this case, a quantity of polymer ranging from 20 to 1000 times the weight of the catalyst.

The polymerization process can be carried out in gas phase and/or in liquid phase, in continuous or batch reactors, such as fluidized bed or slurry reactors. For example, it is possible to carry out the polymerization of the propylene polymer (A) in liquid phase, using liquid propylene as diluent, while the copolymerization stages to obtain the copolymers (B) and (C) can be carried out in gas phase, without intermediate stages except for the partial degassing of the monomers. According to a further embodiment, all the sequential polymerization stages can be carried out in gas phase. In a still further embodiment, the propylene polymer (A) can conveniently be produced by a gas-phase polymerization process carried out in at least two interconnected polymerization zones as described in the European patent EP 782587 and in the International patent application WO00/02929 and the ethylene copolymers (B) and (C) can be produced in conventional gas-phase reactors.

The reaction time, temperature and pressure of the polymerization steps are not critical per se, however the temperature for the preparation of propylene polymer (A) and of ethylene copolymers (B) and (C), that can be the same or different, is usually from 40° C. to 100° C.

The polymerization pressure preferably ranges from 33 to 43 bar, if the polymerization is carried out in liquid phase, and from 5 to 30 bar if carried out in gas phase.

The residence time relative to each of the at least three polymerization stages depends on the desired weight ratio between fractions (A), (B) and (C), and can usually range from 15 minutes to 8 hours. The molecular weight can be tailored in each polymerization step by means of conventional molecular weight regulators known in the art (e.g. hydrogen or $ZnEt_2$).

Customary additives, for example nucleating agents, extension oils, fillers, and other organic and inorganic pigments, that are commonly used in olefin polymers, may be added to the polyolefin compositions of the present invention by conventional mixing processes, i.e. during extrusion. The nucleating agents are preferably added to the compositions of the present invention in quantities ranging from 0.01 to 2 wt %, more preferably from 0.1 to 1 wt % with respect to the total weight of the composition.

The polyolefin compositions of the present invention have a good balance of physical mechanical properties, in particular of stiffness and impact properties at low temperatures, in connection with surprisingly high values of elongation at break and reduced shrinkage. Additionally, they show improved stress whitening resistance and good optical properties.

The above mentioned peculiar features of the polyolefin compositions of the invention render them particularly suitable for use in injection molding applications, in particular for the production of items for the automotive field.

The following examples are given to illustrate, without limiting, the present invention.

The analytical methods described hereinbelow have been used to determine the properties reported in the description and in the examples.

Comonomer (Ethylene) content: By IR spectroscopy.

Xylene-soluble faction (XS) at 25° C.: 2.5 g of polymer and 250 mL of o-xylene are introduced in a glass flask equipped with a refrigerator and a magnetical stirrer. The temperature is raised in 30 minutes up to the boiling point of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Intrinsic Viscosity (XSIV): Measured in tetrahydronaphthalene at 135° C.

Molecular weight (Mw, Mn, Mz): Measured by way of gel permeation chromatography (GPC) in 1,2,4-trichlorobenzene.

Determination of isotactic pentads content (mmmm): 50 mg of each xylene insoluble fraction were dissolved in 0.5 mL of $C_2D_2Cl_4$. The $^{13}C$ NMR spectra were acquired on a Bruker DPX-400 (100.61 Mhz, 90° pulse, 12 s delay between pulses). About 3000 transients were stored for each spectrum; mmmm pentad peak (21.8 ppm) was used as reference. The microstructure analysis was carried out as described in literature (Polymer, 1984, 25, 1640, by Inoue Y. et Al. and Polymer, 1994, 35, 339, by Chujo R. et Al.).

Polydispersity Index: Determined at a temperature of 200° C. by using a parallel plates rheometer model RMS-800 marketed by RHEOMETRICS (USA), operating at an oscillation frequency which increases from 0.1 rad/sec to 100 rad/second. From the modulus separation value, one can derive the P.I. by way of the equation:

$$P.I.=54.6*(modulus\ separation)^{-1.76}$$

in which the modulus separation is defined as:

$$modulus\ separation=frequency\ at\ G'=500\ Pa/frequency\ at\ G''=500\ Pa$$

wherein G' is storage modulus and G" is the loss modulus.

Melt flow rate: ISO 1133 (230° C., 2.16 kg).

Flexural modulus: ISO 178.

Izod impact resistance: ISO 180/1A.

Tensile stress and Elongation at yield and at break: ISO 527

Stress whitening resistance: the resistance to whitening at ambient temperature (about 23° C.) is determined by subjecting small discs (diameter 38 mm, thickness 1.5 mm) prepared from the polymer to be tested to the impact of a dart dropping from different heights. The dart has diameter of 1.27 mm and a weight of 263 g. The stress-whitening resistance is expressed as the diameter of the whitened area (average value over 10 specimens tested for each dropping height).

Shrinkage: rectangular test specimens having dimension 100×200×2.5 mm are prepared by injection molding using a "Sandretto Serie Sette 190". The main process parameters are reported below:

|                              |          |
| ---------------------------- | -------- |
| Back pressure:               | 10 bar   |
| Injection time + holding time: | 30 sec |
| Total cycle time:            | 55 sec   |
| Mould temperature:           | 40° C.   |
| Melt temperature:            | 250° C.  |

The dimension of the test specimens are measured with a 3D measuring system supplied with a "contact probe" (Microval 3D). The shrinkage is the difference between the initial specimen dimensions after injection and after 48 h conditioning at 23° C. and it is expressed as percent with respect to the initial specimen dimensions. The longitudinal shrinkage is the shrinkage measured in the direction of the injection flow; the transversal shrinkage is the shrinkage measured across the direction of the injection flow.

Gloss: 10 rectangular specimens (55×60×1 mm) for each polymer to be tested are injection molded using a Battenfeld BA500CD operated under the following conditions:

|                              |           |
| ---------------------------- | --------- |
| Screw speed:                 | 120 rpm   |
| Back pressure:               | 10 bar    |
| Mould temperature:           | 40° C.    |
| Melt temperature:            | 260° C.   |
| Injection time:              | 3 sec     |
| First holding time:          | 5 sec     |
| Second holding time:         | 5 sec     |
| Cooling time (after second holding): | 10 sec |

The value of the injection pressure should be sufficient to completely fill the mould in the above mentioned indicated time span. By a glossmeter the fraction of luminous flow reflected by the examined specimens surface is measured, under an incident angle of 60°. The reported value corresponds to the mean gloss value over 10 specimens for each tested polymer.

EXAMPLE 1

Preparation of the Solid Catalyst Component

Into a 500 mL four-necked round flask, purged with nitrogen, 250 ml of $TiCl_4$ are introduced at 0° C. While stirring, 10.0 g of microspheroidal $MgCl_2 \cdot 1.8C_2H_5OH$ (prepared according to the method described in ex. 2 of U.S. Pat. No. 4,399,054 but operating at 3000 rpm instead of 10000 rpm) and 9.1 mmol of diethyl 2,3-(diisopropyl)succinate are added. The temperature is raised to 100° C. and maintained for 120 min. Then, the stirring is discontinued, the solid product was allowed to settle and the supernatant liquid is siphoned off. Then the following operations are repeated twice: 250 ml of fresh $TiCl_4$ are added, the mixture is reacted at 120° C. for 60 min and the supernatant liquid is siphoned off. The solid is washed six times with anhydrous hexane (6×100 mL) at 60° C.

Preparation of the Catalyst System and Pre-Polymerisation

Before introducing it into the polymerisation reactors, the solid catalyst component described above is contacted at 12° C. for 24 minutes with aluminium triethyl ($AlEt_3$) and dicyclopentyldimethoxysilane (DCPMS) in such quantity that the weight ratio of $AlEt_3$ to the solid catalyst component is equal to 11, and the weight ratio $AlEt_3$/DCPMS is equal to 3. The catalyst system is then subjected to pre-polymerisation by maintaining it in suspension in liquid propylene at 20° C. for about 5 minutes before introducing it into the first polymerisation reactor.

Polymerization

The polymerisation run is conducted in continuous in a series of three reactors equipped with devices to transfer the product from one reactor to the one immediately next to it. The first reactor is a liquid phase reactor, and the second and third reactors are fluid bed gas phase reactors. Propylene homopolymer (A) is prepared in the first reactor, while ethylene/propylene copolymers (B) and (C) are prepared in the second and third reactor, respectively. Temperature and pressure are maintained constant throughout the course of the reaction. Hydrogen is used as molecular weight regulator. The gas phase (propylene, ethylene and hydrogen) is continuously analysed via gas-chromatography. At the end of the run the powder is discharged and dried under a nitrogen flow.

Then the polymer particles are introduced in an extrusion equipment and mixed with 8500 ppm of talc, 1500 ppm of Irganox B215 (supplied by Ciba-Geigy) and 500 ppm of Ca stearate, to obtain a nucleated composition. The polymer particles are extruded under nitrogen atmosphere in a twin screw extruder, at a rotation speed of 250 rpm and a melt temperature of 200-250° C.

COMPARATIVE EXAMPLE 1 (1c)

Example 1 is repeated modifying the polymerization conditions to obtain different intrinsic viscosity values of the components (B) and (C).

Polymerisation conditions are indicated on Table 1. Tables 2 collects the data of the single components of the polyolefin compositions and of the final polyolefin composition. The properties of the polyolefin composition of the invention and those of the polyolefin composition of Comparative Example 1 are indicated on Table 3.

TABLE 1

| Example and comparative example | | | 1 | 1c |
| --- | --- | --- | --- | --- |
| liquid phase reactor | Polymerisation temperature, ° C. | | 70 | 68 |
| | Pressure, bar | | 40 | 39.5 |
| | Residence time, min | | 68 | 63 |
| | $H_2$ bulk, mol ppm | | 10,000 | 11,000 |
| $1^{st}$ gas phase reactor | Polymerisation temperature, ° C. | | 80 | 80 |
| | Pressure, bar | | 16 | 17 |
| | Residence time, min | | 7 | 22.5 |
| | $C_2^-/(C_2^- + C_3^-)$, % | | 0.17 | 0.12 |
| | $H_2/C_2^-$, % | | 0.075 | 0.019 |
| $2^{nd}$ gas phase reactor | Polymerisation temperature, ° C. | | 80 | 80 |
| | Pressure, bar | | 19 | 20 |
| | Residence time, min | | 22.0 | 24.5 |
| | $C_2^-(C_2^- + C_3^-)$, % | | 0.54 | 0.47 |
| | $H_2/C_2^-$, % | | 0.2 | 0.052 |

Notes:
$H_2$ bulk = hydrogen concentration in the liquid monomer;
$C_2^-$ = ethylene; $C_3^-$ = propylene.

TABLE 2

| Example and comparative example | | 1 | 1c |
| --- | --- | --- | --- |
| Propylene homopolymer (A) | | | |
| Homopolymer content | wt % | 61.7 | 58.5 |
| MFR | g/10 min | 100 | 150 |
| Polydispersity index | | 5.7 | 7 |
| Mw/Mn ratio | | 10.9 | 10.9 |
| Mz/Mn ratio | | 7.7 | 8.5 |

TABLE 2-continued

| Example and comparative example | | 1 | 1c |
|---|---|---|---|
| Pentad content | mol % | 98 | 97.7 |
| XS | wt % | 2.5 | 3.5 |
| First ethylene copolymer (B) | | | |
| Copolymer content | wt % | 14.5 | 13.5 |
| Ethylene content | wt % | 27 | 28 |
| XSIV | dl/g | 2.91 | 3.8 |
| Second ethylene copolymer (C) | | | |
| Copolymer content | wt % | 23.8 | 28 |
| Ethylene content | wt % | 60 | 61 |
| XSIV | dl/g | 1.62 | 3.16 |
| Final polyolefin composition | | | |
| MFR | g/10 min | 16.3 | 7.8 |
| Total ethylene content | wt % | 18.3 | 20.7 |
| (B) + (C) | wt % | 38.3 | 41.5 |
| XS | wt % | 32.1 | 34.7 |
| Ethylene content in XS | wt % | 43 | 44.1 |
| Xylene-insoluble fraction (XI) | wt % | 67.9 | 65.3 |
| Ethylene content in XI | wt % | 8.9 | 11.5 |
| XSIV | dl/g | 2.17 | 3.43 |

TABLE 3

| Example and Comparative example | | 1 | 1c |
|---|---|---|---|
| Flexural modulus | MPa | 965 | 823 |
| Izod Impact resistance at | | | |
| 23° C. | kJ/m$^2$ | 41 | 56 |
| 0° C. | kJ/m$^2$ | 31.8 | 56 |
| −20° C. | kJ/m$^2$ | 6.3 | 16.2 |
| Tensile strength at yield | MPa | 17.8 | 15.9 |
| Elongation at Yield | % | 8.2 | 7.6 |
| Tensile strength at break | MPa | 16.4 | 15.7 |
| Elongation at break | % | 700 | 423 |
| Shrinkage longitudinal | | 0.96 | 1.32 |
| transversal | | 1.07 | 1.54 |
| Gloss 60° | % | 71 | 40 |
| Stress-whitening: | | | |
| 70 cm | mm | 16 | 22 |
| 30 cm | mm | 14 | 14 |
| 20 cm | mm | 12 | 12 |
| 10 cm | mm | 11 | 10 |
| 4 cm | mm | 7 | 9 |

The invention claimed is:

1. A polyolefin composition comprising (percentages based on the sum of component (A) to (C)):
   (A) from 50 to 80 wt % of a propylene polymer comprising a polydispersity index value ranging from 4.5 to 10 and a content of isotactic pentads, measured by $^{13}$C-NMR on a fraction insoluble in xylene at 25° C., higher than 97.5 mol %, said polymer being selected from propylene homopolymers or copolymers of propylene with at least one linear or branched alpha-olefin comprising from 2 to 8 carbon atoms other than propylene, said copolymer containing at least 95 wt % (based on the copolymer) of units derived from propylene;
   (B) from 5 to 20 wt % of a first copolymer of ethylene with at least one linear or branched alpha-olefin having 3 to 8 carbon atoms, said first copolymer of ethylene containing from 25 to less than 40 wt % (with respect to the component (B)) of units derived from ethylene and having a solubility in xylene at 25° C. ranging from more than 85 to 95 wt %; and
   (C) from 10 to 40 wt % of a second copolymer of ethylene with at least one linear or branched alpha-olefin having 3 to 8 carbon atoms, said second copolymer containing from 50 up to 75 wt % (with respect to the component (C)) of units derived from ethylene, having a solubility in xylene at 25° C. ranging from 50 to 85 wt % and an intrinsic viscosity of a fraction soluble in xylene lower than 1.8 dl/g.

2. The polyolefin composition of claim 1, further comprising an intrinsic viscosity of the xylene-soluble fraction of component (B) ranging from 2.5 to 4.5 dl/g.

3. The polyolefin composition of claim 1, wherein the propylene polymer (A) is a propylene homopolymer and the ethylene copolymers (B) and (C) are ethylene/propylene copolymers.

4. The polyolefin composition of claim 1, further comprising at least one of
   a total ethylene content of less than 23 wt %;
   an intrinsic viscosity of a total xylene soluble fraction lower than 2.3 dl/g; and
   a Melt Flow Rate (MFR) value of from 2 to 30 g/10 min.

5. The polyolefin composition of claim 1, further comprising an MFR value of propylene polymer (A) ranging from 10 to 200 g/10 min.

6. A polymerization process comprising at least three polymerization stages, with each subsequent polymerization stage being conducted in the presence of the polymeric material formed in the immediately preceding polymerization reaction, wherein the component (A) is prepared in at least one first polymerization stage and the copolymers (B) and (C) are prepared in at least two polymerization stages.

7. The polymerization process of claim 6 wherein each polymerization stage is carried out in presence of a catalyst system comprising:
   a solid catalyst component comprising at least one titanium compound comprising at least one titanium-halogen bond and at least an electron-donor compound, both supported on magnesium chloride;
   an organo-aluminum compound; and
   optionally, an external electron-donor compound.

8. A process comprising injection molding a polyolefin composition comprising (percentages based on the sum of component (A) to (C):
   (A) from 50 to 80 wt % of a propylene polymer comprising a polydispersity index value ranging from 4.5 to 10 and a content of isotactic pentads, measured by $^{13}$C-NMR on a fraction insoluble in xylene at 25° C., higher than 97.5 mol %, said polymer being selected from propylene homopolymers or copolymers of propylene with at least one linear or branched alpha-olefin comprising from 2 to 8 carbon atoms other than propylene, said copolymer containing at least 95 wt % (based on the copolymer) of units derived from propylene;
   (B) from 5 to 20 wt % of a first copolymer of ethylene with at least one linear or branched alpha-olefin having 3 to 8 carbon atoms, said first copolymer of ethylene containing from 25 to less than 40 wt % (with respect to the component (B)) of units derived from ethylene and having a solubility in xylene at 25° C. ranging from more than 85 to 95 wt %; and
   (C) from 10 to 40 wt % of a second copolymer of ethylene with at least one linear or branched alpha-olefin having 3 to 8 carbon atoms, said second copolymer containing from 50 up to 75 wt % (with respect to the component (C)) of units derived from ethylene, having a solubility in xylene at 25° C. ranging from 50 to 85 wt % and an intrinsic viscosity of a fraction soluble in xylene lower than 1.8 dl/g.

9. An article comprising a polyolefin composition comprising (percentages based on the sum of component (A) to (C):

(A) from 50 to 80 wt % of a propylene polymer comprising a polydispersity index value ranging from 4.5 to 10 and a content of isotactic pentads, measured by $^{13}$C-NMR on a fraction insoluble in xylene at 25° C., higher than 97.5 mol %, said polymer being selected from propylene homopolymers or copolymers of propylene with at least one linear or branched alpha-olefin comprising from 2 to 8 carbon atoms other than propylene, said copolymer containing at least 95 wt % (based on the copolymer) of units derived from propylene;

(B) from 5 to 20 wt % of a first copolymer of ethylene with at least one linear or branched alpha-olefin having 3 to 8 carbon atoms, said first copolymer of ethylene containing from 25 to less than 40 wt % (with respect to the component (B)) of units derived from ethylene and having a solubility in xylene at 25° C. ranging from more than 85 to 95 wt %; and (C) from 10 to 40 wt % of a second copolymer of ethylene with at least one linear or branched alpha-olefin having 3 to 8 carbon atoms, said second copolymer containing from 50 up to 75 wt % (with respect to the component (C)) of units derived from ethylene, having a solubility in xylene at 25° C. ranging from 50 to 85 wt % and an intrinsic viscosity of a fraction soluble in xylene lower than 1.8 dl/g.

* * * * *